July 22, 1941.  C. L. HALL  2,249,896

SEPARABLE FASTENER

Filed March 26, 1940

INVENTOR:
CHARLES L. HALL,
BY John Jodd ATT'Y.

Patented July 22, 1941

2,249,896

UNITED STATES PATENT OFFICE 2,249,896

SEPARABLE FASTENER

Charles L. Hall, Detroit, Mich., assignor to United-Carr Fastener Corporation, Cambridge, Mass., a corporation of Massachusetts Application March 26, 1940, Serial No. 325,982

9 Claims. (Cl. 24—208)

This invention relates to improvements in separable fastener installations.

The aim of my invention is to provide a fastener installation including stud and socket cooperating fastener members and means in the form of a cam engageable with one of the members on movement of the member in the direction of the cam to effect automatic separation of the parts of the fastener.

Other objects and uses of my invention will be apparent from inspection of the drawing and specification hereinbelow set forth.

Referring to the drawing, in which I have illustrated preferred embodiments of my invention:

My invention is particularly adaptable to use with automobiles having the new vacuum-operated convertible tops. In connection with automobiles having this type of top, it is essential that the top, which is secured to the sides of the body of the automobile when up, be capable of separation from the body as the top moves toward the rear of the automobile in the folding-back operation by which the top is put down. In my preferred forms of invention I have provided a retainer member adapted to be secured to the body of the automobile, a stud member assembled with the retainer member in a way to be laterally movable and a socket member assembled with the top and in fastened engagement with the stud member when the top is up. As the top moves toward the rear of the car in substantially parallel relation to the body during folding-down action of the vacuum-operated top, the socket member engages a cam provided by the retainer member to effect automatic separation of the fastener members without tearing or damaging the material of the top.

Figure 1:
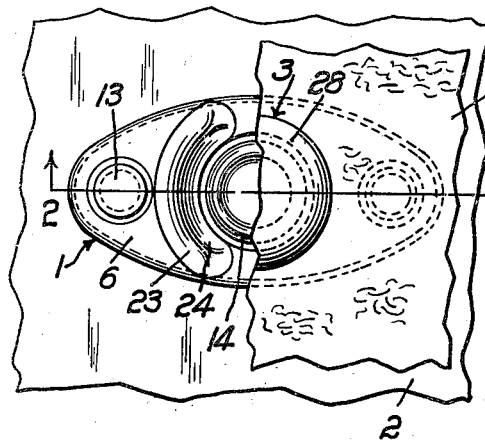
Fig. 1 is a front elevation partly broken away showing my preferred form of separable fastener installation.
Figure 2:
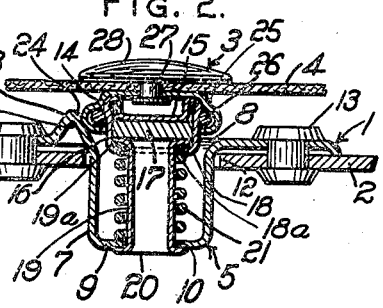
Fig. 2 is a section taken along the line 2—2 of Fig. 1.
Figure 3:
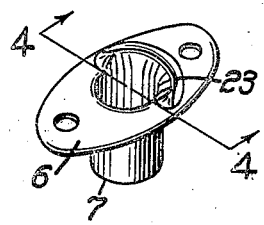
Fig. 3 is a perspective view of the retainer member forming part of my improved fastener installation.

Referring to my preferred installation illustrated in Figs. 1 and 2, I have shown a stud unit 1 preferably secured to a support 2, which may be the body of an automobile, and a socket unit 3 carried by a strip of material 4, which may be a so-called convertible top. Referring in detail to the component parts of the socket unit 1, I have provided a one-piece retainer member 5 (Fig. 2) having a flange portion 6 and a cup-shaped body 7 drawn from the flange 6. The body 7 has a wide opening 8 at its end adjacent the flange 6 and a bottom portion 9 at an opposite end having a smaller opening 10. In assembly of the retainer member 5 with the support 2 the flange 6 is disposed adjacent the outer surface 11 of the support 2 with the cup-shaped body 7 projecting through an opening 12 of the support. The retainer member is secured in permanent assembly with the support 2 through any suitable means such as rivets 13 extending through the flange 6 and the support 2. One part of a separable fastener in the form of a stud member is assembled with the retainer member within the body 7. The stud member with which I have chosen to illustrate my invention presents a head having a peripheral bead 14 (Fig. 5), a central depressed portion 15 in the head (Fig. 2) and a neck portion 16. A metal insert 17 is assembled within the head between the portion 15 and the base 18 of the head. The base 18 has an opening 18ª. The stud member has an attaching portion in the form of a tubular shank 19 assembled with the stud head and having a head 19ª fixed between the base 18 and the insert 17. The shank 19 extends beneath the stud head through the opening 10 of the bottom 9 of the body 7 and is headed over as at 20 to secure the stud member in permanent assembly with the retainer member. It is important to notice that the diameter of the shank portion 19 is substantially less than the diameter of the aperture 10 of the bottom portion so as to permit tipping of the shank 19 with a consequent lateral movement of the stud head 14 for a purpose to be described. A coil spring 21 surrounds the shank 19, in my preferred installation, and engages the head 19ª of the shank through the opening 18ª of the base 18 and the bottom 9 of the body 7 to maintain the stud head at a position projecting above the plane of the flange 6, viewing Fig. 2, in order that a cooperating socket member may be engaged therewith. The coil spring 21 exerts an upward force upon the stud head greater than the downward force necessary to engage the socket member with the stud member whereby the stud head remains substantially in fixed position during the fastening operation. The flange 6 is embossed as at 22 (Fig. 2) forming an upwardly projecting rib 23 adjacent the opening 8. The rib 23 is preferably in the form of an arc to conform substantially with the curve of the circumference of the opening 8 and provides an inclined camming surface 24 on its side facing the opening 8. The camming surface 24 serves to effect automatic separation of the stud and socket members, as hereinbelow more fully described.

Referring in detail to my preferred form of socket unit 3, I have shown one having a casing 25 containing a spring 26 for engagement with the neck 16 of the stud head. This socket member may be secured to the strip 4 in any suitable manner, but I have preferred to secure it thereto by a rivet 27 extending from a cap 28 secured to an opposite side of the strip 4. Although I have chosen to illustrate my invention with the particular forms of stud and socket members hereinabove described, it will be understood from consideration of the operation of the fastening as hereinbelow set out that other forms of cooperating fastener members could be substituted for those shown in the drawing or the position of the stud and socket members could be reversed without departing from the scope of the invention which relates broadly to the automatic separation feature.

Figure 5:
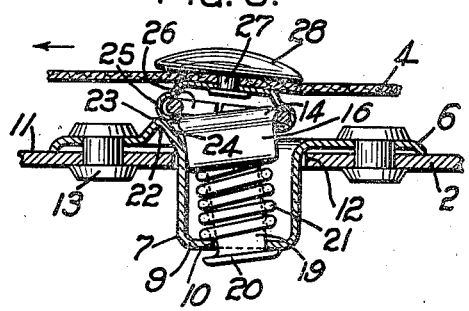
Fig. 5 is a section similar to Fig. 2 showing operation of the parts of the installation to effect automatic separation of the members of the fastener.
Figure 4:
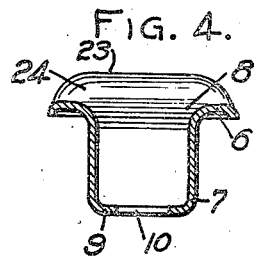
Fig. 4 is a section taken along the line 4—4 of Fig. 3.

The manner in which automatic separation of the stud and socket members is effected will be most clearly understood from inspection of Fig. 5. Thus when the material of the top 4 moves in the direction indicated by the arrow, as when the top folds down, the socket member is moved toward the projecting rib 23 to engage the casing 25 of the socket with the camming surface 24. As the socket member continues to move in the direction of the arrow, the casing rides up over the camming surface 24 to separate the socket member from the stud. During this lateral movement of the socket member which is in engagement with the stud head, the stud head will also be carried laterally in the direction of the projecting rib 23 and the stud member will be held in tipped position until the socket is completely separated from the stud head, at which time the stud head will return to normal centered position under the force exerted by the spring 21 on the shank 19.

Figure 6:
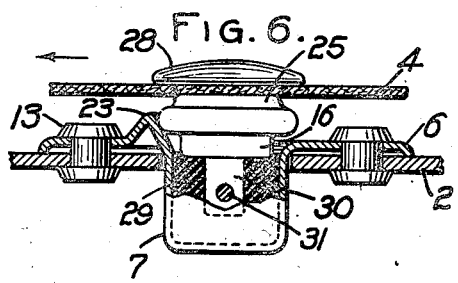
Fig. 6 is a view partly in section showing a modified form of fastener installation.

Referring to my modified form of installation shown in Fig. 6, the body 7 of the retainer member is filled with flexible material in the nature of sponge rubber 29. The stud head rests upon the rubber 29 and has a depending attaching portion or shank 30 extending into the body of the rubber 29 and assembled with the retainer for pivotal movement relative to the walls thereof by means of a pin 31 extending through the shank 30 and the walls of the body 7. Thus when the stud head is moved in the direction of the projecting rib 23 during separation of the fastener members, the rubber is compressed and, after complete separation of the stud and socket members, the rubber, in its effort to resume its normal shape, exerts pressure on the shank 30 to return the stud head to normal position.

Although I have illustrated and described preferred embodiments of my invention, I do not wish to be limited thereby because the scope of my invention is best defined by the following claims.

I claim:

1. A separable fastener installation comprising a support, a fastener member carried by said support, a second fastener member secured to a part and engaged with said first member, means for preventing relative parallel movement of said fastener members in a plurality of directions such as tend to separate said fastener members, and fastener-separating means laterally adjacent said members for engaging one of said members and automatically separating it from the other member when subjected to substantially parallel movement laterally in one direction.

2. A separable fastener installation comprising a support, a fastener retainer carried by said support, one member of a cooperative stud and socket separable fastener combination assembled with said retainer and laterally movable therein, a second member of said fastener combination lockingly engaged with said first member and resisting separation of said members when subjected to a movement substantially parallel to said support in either of a plurality of lateral directions, and means laterally adjacent said members engaging one of said members and automatically separating said members when the second member is subjected to movement in a direction toward said means.

3. A separable fastener installation comprising a support, a fastener retainer member carried by said support, one member of a separable stud and socket fastener combination assembled with said retainer member and laterally movable therein, a second member of said fastener combination engaged with said first member and resisting separation of said members when subjected to a movement substantially parallel to said support in either of a plurality of lateral directions, and means on said retainer laterally adjacent said fastener members engaging one of said members and automatically separating said members when the second member is subjected to movement in a direction toward said means.

4. A separable fastener installation comprising a support, a fastener retainer member carried by said support, one member of a separable fastener assembled with said retainer member and laterally movable therein, a second member of said fastener in engagement with said first member, a camming portion integral with said retainer laterally adjacent said fastener members, said camming portion engaging one of said members and automatically separating said members on movement of one of said members toward said camming portion.

5. A separable fastener installation comprising a support, a retainer member assembled with said support having a hollow body, one member of a separable fastener combination assembled with said retainer member within said hollow body, said member being laterally movable relative to the walls of said retainer member, a second member of said fastener combination in engagement with said first member, a camming portion integrally joined to said hollow body laterally adjacent said members, said camming portion engaging said second member and tilting it axially to separate said members as a result of lateral movement of said members toward said camming portion.

6. A separable fastener installation comprising a support, a retainer member assembled with said support having a hollow body, a stud member assembled with said retainer within said hollow body, said stud member being laterally movable relative to the walls of said retainer member, means maintaining said stud member normally in predetermined position relative to the walls of said retainer member but permitting said lateral movement, a socket member carried by another part and engaged with said stud, a camming portion integrally joined to said retainer member laterally adjacent said socket, said camming portion engaging said socket member and automatically separating said stud and socket members on movement of said socket member toward said camming portion.

7. A separable fastener installation comprising a support, a retainer member assembled with said support, said retainer member having a flange portion and a cup-shaped body portion drawn from said flange and having an opening, a stud member assembled with said retainer within said cup-shaped body, said stud member having a stud head laterally movable relative to the walls of said member, a socket member carried by another part, said socket member being engaged with said stud head, a projection on the flange of said retainer member adjacent said opening of said cup-shaped body, said projection having an inclined camming surface engaging said socket member and separating said stud and socket members on movement of said socket member toward said camming portion.

8. A separable fastener installation comprising a support, a retainer member assembled with said support, said retainer member having a flange portion and a cup-shaped body portion drawn from said flange, said body having an opening at an end adjacent said flange and a bottom portion at an opposite end, a stud member assembled with said retainer within said body, said stud member having a head and a shank extending from said head through said bottom portion, said stud member being laterally movable relative to the walls of said body, a coil spring assembled with said shank and cooperating with said shank and said body to maintain said shank normally in predetermined position relative to said body but permitting said lateral movement of said stud member, a socket member carried by another part and engaged with said stud head, a camming portion integrally joined to said retainer member laterally adjacent said socket, said camming portion engaging said socket member and automatically separating said stud and socket members on movement of said socket member toward said camming portion.

9. A separable fastener installation comprising a support, a retainer member assembled with said support, said retainer member having a flange portion and a cup-shaped body portion drawn from said flange, said body having an opening at an end adjacent said flange and a bottom portion at an opposite end, a stud member assembled with said retainer within said body, said stud member having a head and shank, said stud member being laterally movable relative to the walls of said shank, flexible material in the nature of sponge rubber disposed within said body and surrounding said shank to maintain said shank normally in predetermined position relative to said body but permitting said lateral movement of said stud member, a socket member carried by another part and engaged with said stud head, a camming portion joined to said retainer member laterally adjacent said socket, said camming portion engaging said socket member and automatically separating said stud and socket members on movement of said socket member toward said camming portion.

CHARLES L. HALL.